July 21, 1931.  K. SCHMIDT  1,815,452
ARRANGEMENT FOR LIGHTING TRAINS
Filed Nov. 5, 1929
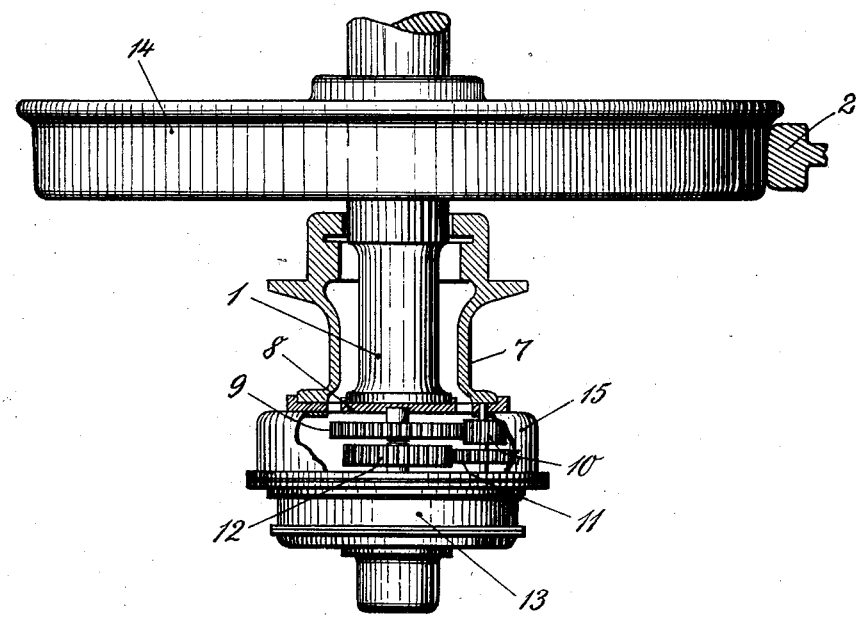
Inventor:
Karl Schmidt
Attorney Patented July 21, 1931

1,815,452

UNITED STATES PATENT OFFICE

KARL SCHMIDT, OF BERLIN-LICHTENRADE, GERMANY, ASSIGNOR TO C. LORENZ AKTIENGESELLSCHAFT, OF BERLIN-TEMPELHOF, GERMANY

ARRANGEMENT FOR LIGHTING TRAINS

Application filed November 5, 1929, Serial No. 404,916, and in Germany November 16, 1928.

This application relates to railroad car lighting and more particularly to a method for securing a generator to a car axle.

It has heretofore been the practice to secure generators of this type to the body of the car and drive the same by a belt from the axle of the car. Due to the size of direct current generators, it has been impractical to mount them on the axle housing in line with the axle and it therefore has been found necessary to mount them at one side of the axle and to provide a weight as a counter balance, thereby making a bulky and expensive installation.

According to the present invention a mean frequency generator is substituted for the direct current generator in view of the fact that its efficiency is substantially the same as that of the direct current generator while it is only one fourth as wide, due to the fact that there are no sliding or corrector rings and no winding on the rotor.

It is therefore the object of this invention to provide a connection whereby a mean frequency generator may be mounted on the axle housing in direct line with the axle.

A clearer conception of the invention may be had from the following description taken in conjunction with the accompanying drawing in which, Fig. 1 discloses a side view of the preferred form of the invention.

In Fig. 1 is shown the axle with a car wheel 14 thereon. The car wheel is shown bearing on a rail 2. The axle is held in a bearing 7 to which is secured, in alignment therewith, a mean frequency generator 13. Between the bearing or axle housing and the generator is a gear housing 15 containing the gear train comprising gears 9, 10, 11 and 12. Gear 9 is directly connected to the stub of axle 1 by a key 8 and is in alignment with the axle. This gear meshes with a gear 10 secured to a common shaft with gear 11 which in turn meshes with gear 12 which is secured to the armature shaft of generator 13.

The above gear train is provided to increase the speed of rotation of the generator 13 with relation to the wheel 14, so that even at a relatively low speed of travel, the generator will be able to supply the necessary current for lighting purposes.

As is evident from the above, the space required by a mean frequency generator is so much less than that of a direct current generator that it may be mounted on the end of the axle bearing housing and in line therewith rather than at the side thereof, thereby obviating the necessity of a counter balance and simplifying the installation.

I claim:

1. In a car lighting system, an axle stub, a generator, an armature shaft, said generator being mounted on the bearing of said axle and said shaft being in direct line with and connected to said axle by a gear train.

2. In a car lighting system, an axle stub, a mean frequency generator, an armature shaft for said generator, said generator being mounted on the bearing of said axle, said shaft being in direct line with and connected to said axle stub by a gear train and a key for connecting said stub to said gear train.

In testimony whereof I have affixed my signature.

KARL SCHMIDT.